(12) United States Patent
Boileau et al.

(10) Patent No.: US 12,221,941 B2
(45) Date of Patent: Feb. 11, 2025

(54) REVERSER WITH MOVABLE CASCADES FOR AN AIRCRAFT PROPULSION ASSEMBLY, COMPRISING A SYSTEM FOR LIMITING THE BUCKLING OF AN ACTUATOR OF THE REVERSER

(71) Applicant: SAFRAN NACELLES, Gonfreville-l'Orcher (FR)

(72) Inventors: Patrick André Boileau, Moissy-Cramayel (FR); Fabien Jourdan, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/685,731

(22) PCT Filed: Aug. 24, 2022

(86) PCT No.: PCT/FR2022/051607
§ 371 (c)(1),
(2) Date: Feb. 22, 2024

(87) PCT Pub. No.: WO2023/026014
PCT Pub. Date: Mar. 2, 2023

(65) Prior Publication Data
US 2024/0344486 A1    Oct. 17, 2024

(30) Foreign Application Priority Data
Aug. 25, 2021    (FR) ...................................... 2108893

(51) Int. Cl.
*F02K 1/76*    (2006.01)
*F02K 1/72*    (2006.01)

(52) U.S. Cl.
CPC ................. *F02K 1/763* (2013.01); *F02K 1/72* (2013.01); *F05D 2220/323* (2013.01); *F05D 2240/129* (2013.01)

(58) Field of Classification Search
CPC ... F02K 1/72; F02K 1/763; F02K 1/76; F05D 2240/129
See application file for complete search history.

(56) References Cited

U.S. PATENT DOCUMENTS

| | | | |
|---|---|---|---|
| 4,137,711 A | * | 2/1979 | Montgomery ............ F02K 1/72 239/265.31 |
| 10,605,197 B2 | | 3/2020 | Sawyers-Abbott et al. |

(Continued)

FOREIGN PATENT DOCUMENTS

| | | |
|---|---|---|
| EP | 1 239 139 A1 | 9/2002 |
| FR | 2.132.380 | 11/1972 |

(Continued)

OTHER PUBLICATIONS

International Search Report mailed on Dec. 14, 2022 in PCT/FR2022/051607 filed on Aug. 24, 2022 (2 pages).

*Primary Examiner* — Jason H Duger
(74) *Attorney, Agent, or Firm* — Oblon, McClelland, Maier & Neustadt, L.L.P.

(57) ABSTRACT

A thrust reverser for an aircraft propulsion unit, including a movable system with cascade vanes and an actuator allowing moving a movable system between an advanced direct thrust position and a backward thrust reversal position, the system also including an inter-cascade structure for limiting buckling of the actuator, forming a channel crossed by the actuator and delimited by a cylindrical internal surface extending along a first closed directrix curve, the fixed portion of the actuator including an end equipped with an external ring for limiting buckling of the actuator, the ring having a cylindrical external surface extending along a (Continued)

second closed directrix curve, the first and second closed directrix curves preferably having the same shapes and being concentric while being spaced apart from one another with the same spacing.

9 Claims, 6 Drawing Sheets

(56) References Cited

U.S. PATENT DOCUMENTS

| | | | | |
|---|---|---|---|---|
| 2013/0200178 A1* | 8/2013 | Welch | ............... | F02K 1/09 |
| | | | | 239/265.19 |
| 2014/0154064 A1* | 6/2014 | Bouteiller | ............... | F02K 1/566 |
| | | | | 239/265.19 |
| 2022/0316427 A1* | 10/2022 | Cazuc | ............... | F02K 1/763 |

FOREIGN PATENT DOCUMENTS

| | | |
|---|---|---|
| FR | 2 981 989 A1 | 5/2013 |
| FR | 2 999 239 A1 | 6/2014 |
| FR | 3 002 785 A1 | 9/2014 |
| FR | 3 073 572 A1 | 5/2019 |
| WO | WO 2015/028755 A1 | 3/2015 |
| WO | WO 2021/044096 A1 | 3/2021 |
| WO | WO-2021123621 A1 * | 6/2021 ............... F02K 1/72 |

\* cited by examiner

REVERSER WITH MOVABLE CASCADES FOR AN AIRCRAFT PROPULSION ASSEMBLY, COMPRISING A SYSTEM FOR LIMITING THE BUCKLING OF AN ACTUATOR OF THE REVERSER

TECHNICAL FIELD

The invention relates to the field of nacelles and thrust reversers for an aircraft propulsion unit, and, more particularly, to nacelles equipped with reversers with movable cascade vanes.

PRIOR ART

The thrust reversers are devices allowing deflecting forwards the flow of air passing through the propulsion unit, so as to shorten landing distances, and limit loads of the brakes on the landing gears.

Reversers with cascade vanes currently operating in the aeronautical sector comprise a front frame forming, with the cascade vanes, a fixed portion of the reverser, intended to be connected to a turbomachine casing.

More recent technical developments have allowed developing reversers with movable cascade vanes, as described for example in the documents FR2981989A1, FR2999239A1, FR3002785A1 and FR3073572A1.

In comparison with a conventional thrust reverser with fixed cascade vanes, the mobility of the cascade vanes allows reducing the length of the nacelle, and, consequently, reducing its mass as well as the drag generated thereby.

The implantation of movable reverser cascades requires adapting the design of numerous portions of the reverser with regards to the solutions with fixed cascade vane. Among the required adaptations, there is a need to limit buckling of the actuators, to prevent them from deforming too much, at the risk of causing blocking and/or failure thereof. The buckling of the actuators may be encountered in fatigue conditions, and in the event of a failure resulting in a considerable compressive force on the actuator concerned by the failure.

DISCLOSURE OF THE INVENTION

First of all, an object of the invention is a thrust reverser for an aircraft propulsion unit, the reverser having a longitudinal central axis and comprising a fixed structure and a movable system, the movable system comprising at least one reverser cowl and at least one set of cascade vanes comprising a plurality of cascade vanes, the reverser also including an actuator equipped with a fixed portion and a portion movable relative to the fixed portion, so as to be able to move the movable system in translation relative to the fixed structure of the reverser according to the longitudinal central axis, between an advanced direct thrust position and a backward thrust reversal position.

According to the invention, the movable system also includes an inter-cascade structure for limiting buckling of the actuator, the inter-cascade structure being interposed between two directly consecutive cascade vanes and forming a channel crossed by the actuator, the channel being delimited by a cylindrical internal surface extending circumferentially along at least one portion of a first closed directrix curve of the cylindrical internal surface. In this respect, the cylindrical internal surface then preferably extends circumferentially all along the first closed directrix curve, or is circumferentially interrupted while extending along only one portion of the first closed directrix curve.

In addition, the fixed portion of the actuator passes through the channel and comprises an outlet end of the movable portion, this outlet end being equipped with an external ring for limiting buckling of the actuator, the ring having a cylindrical external surface extending circumferentially along at least one portion of a second closed directrix curve of the cylindrical external surface. In this respect, the cylindrical external surface then preferably extends circumferentially all along the second closed directrix curve, or is circumferentially interrupted while extending along only one portion of the second closed directrix curve.

Finally, preferably, in a buckling unconstrained configuration of the actuator, the first and second closed directrix curves have, when viewed according to the longitudinal central axis, the same shapes and are concentric by being spaced apart from one another by the same spacing along these. Alternatively, the two shapes could be different and/or the spacing could be non-constant, for example by providing for the first and second directrix curves not being concentric, without departing from the scope of the invention.

Thus, the invention allows using an inter-cascade structure for limiting buckling of the actuator, using a ring equipping this actuator and serving as a potential stop in a channel defined by this same inter-cascade structure. In other words, during the movement of the movable system of the reverser, the amplitude of a possible buckling of the actuator remains controlled by being able to go beyond the value of the initial spacing between the first and second closed directrix curves. Indeed, once this spacing is consumed, the ring comes into contact with the cylindrical internal surface of the channel of the inter-cascade structure, thereby limiting buckling of the actuator according to a controlled amplitude.

Thanks to this compact, reliable and inexpensive solution, wherein the movable portion of the actuator projects axially downstream with respect to the outlet end provided on the fixed portion of this same actuator, the risks of acceleration of fatigue as well as the risks of possible failures of the actuators, related to the buckling phenomenon, are advantageously reduced.

Preferably, the invention provides for at least one of the following optional technical features, considered separately or in combination.

Preferably, said at least one set of cascade vanes also comprises a rear structure for supporting the cascade vanes on which a rear end of the plurality of cascade vanes is fastened, as well as a front structure for supporting the cascade vanes on which a front end of the plurality of cascade vanes is fastened, and the inter-cascade structure for limiting buckling includes a front end and a rear end respectively fastened on the support front structure and on the support rear structure.

Preferably, the first and second closed directrix curves have a circular shape. Nevertheless, other shapes may be considered, like for example more ovalised shapes. These shapes are generally retained so as to be identical or substantially identical to the general shape of the fixed portion of the actuator, provided with its possible external equipment.

Preferably, the cylindrical internal surface of the channel extends circumferentially all along the first closed directrix curve, the inter-cascade structure for limiting buckling being preferably made in one-piece.

According to another possibility, the cylindrical internal surface of the channel is circumferentially interrupted by extending along only one portion of the first closed directrix curve, so as to define several cylindrical internal surface angular sectors, preferably two angular sectors spaced apart from one another, the inter-cascade structure for limiting buckling being preferably made using two axial beams respectively defining the two angular sectors. In this multi-sector embodiment, each of these sectors extends for example over an amplitude greater than 100°.

Preferably, the inter-cascade structure for limiting buckling is further functionalised so as to include an external surface forming an axial slide track for the movable system. This allows reducing friction forces, and facilitating the movement of the movable system of the reverser between its two positions.

Preferably, the external ring for limiting buckling is made in one-piece, split, or sectorised. When it is split or sectorised, its placement and replacement on the fixed portion of the actuator are facilitated.

Preferably, the external ring for limiting buckling is made of an antifriction material.

Preferably, the actuator is a hydraulic or electric cylinder.

Another object of the invention is a propulsion unit for an aircraft, comprising a turbomachine and a nacelle equipped with a thrust reverser as described hereinabove. Other advantages and features of the invention will appear in the non-limiting detailed description hereinbelow.

BRIEF DESCRIPTION OF THE DRAWINGS

The following detailed description refers to the appended drawings wherein.

DETAILED DESCRIPTION OF THE EMBODIMENTS

Figure 1:
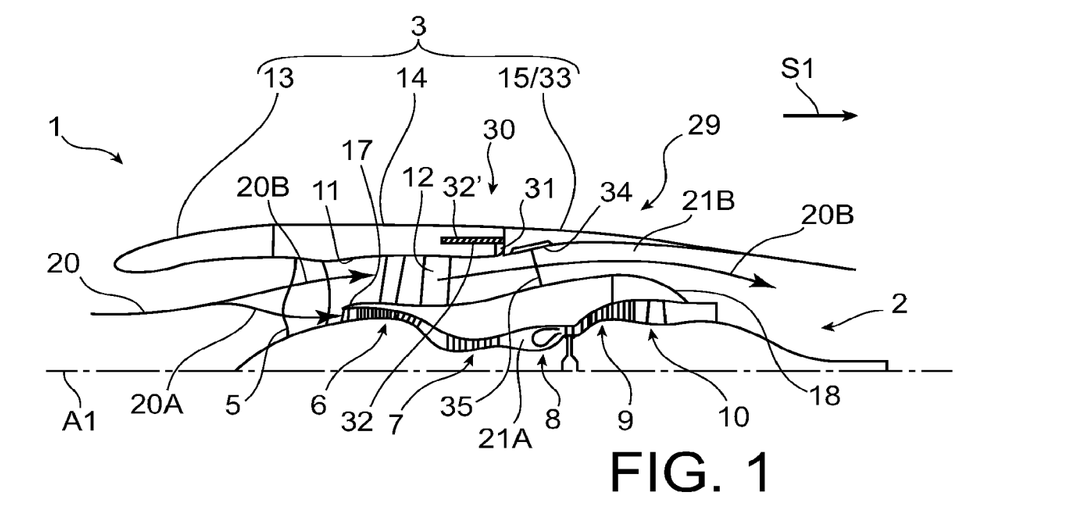
FIG. 1 is a schematic longitudinal sectional half-view of a propulsion unit, comprising a thrust reverser shown in the direct thrust configuration.
Figure 2:
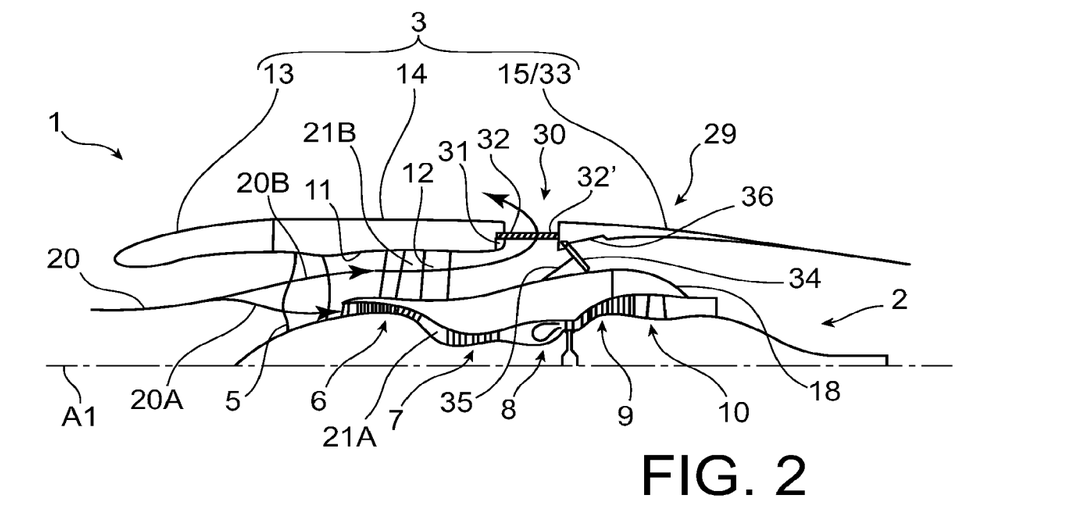
FIG. 2 is a schematic longitudinal sectional half-view of the propulsion unit shown in FIG. 1, with the reverser shown in the thrust reversal configuration.

FIGS. 1 and 2 show an aircraft propulsion unit 1 having a longitudinal central axis A1.

Next, the terms "front" and "rear" are defined with respect to a general direction S1 of the flow of the gases through the propulsion unit 1, along the axis A1 when the latter generates a thrust. These terms "front" and "rear" could be substituted, respectively, with the terms "upstream" and "downstream", with the same meaning.

The propulsion unit 1 comprises a turbomachine 2, a nacelle 3 as well as a mast (not shown), intended to connect the propulsion unit 1 to a wing (not shown) of the aircraft.

In this example, the turbomachine 2 is a twin-spool turbofan engine comprising, from the front to the rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbojet engine 2 is provided with a fan casing 11 connected to the gas generator by structural arms 12.

The nacelle 3 comprises a front section forming an air inlet 13, a middle section which includes two fan cowls 14 surrounding the fan casing 11, and a rear section 15.

In operation, an air flow 20 enters the propulsion unit 1 via the air inlet 13, passes through the fan 5 and then splits into a primary flow 20A and a secondary flow 20B. The primary flow 20A flows in a gas circulation primary flow path 21A passing through the gas generator. The secondary flow 20B flows in a secondary flow path 21B surrounding the gas generator. The secondary flow path 21B is delimited radially inwards by an inner fixed fairing which surrounds the gas generator. In this example, the inner fixed fairing comprises a first section 17 belonging to the middle section 14, and a second section 18 extending rearwards starting from the first section 17, so as to form a portion of the rear section 15.

Radially outwards, the secondary flow path 21B is delimited by the fan casing 11, and, in the configuration of FIG. 1, by reverser movable cowls forming the rear section 15 of the nacelle 3, which will be described later on.

The nacelle 3 includes a thrust reverser 30 comprising, on the one hand, a fixed structure 31 secured to the fan casing 11 and, on the other hand, a system 29 movable relative to the fixed structure 31. The movable system 29 of the reverser 30 comprises at least one set 32' of cascade vanes 32, the aforementioned reverser movable cowls 33, the sealing flaps 34 and the connecting rods 35. The thrust reverser 30 is also centred on the axis A1, like the turbomachine 2.

FIG. 1 shows the reverser 30 in a direct thrust configuration. In this configuration, the movable cowls 33 and the set 32' of the movable system 29 are in a closure position, or advanced position, in which the reverser cowls 33 bear on the fixed structure 31. In this same position of the movable system 29, the cascade vanes 32 are accommodated in a space delimited radially by the fan casing 11 on the one hand, and by the fan cowls 14 on the other hand. In the direct thrust configuration, the sealing flaps 34 are retracted within a cavity 36 (cf. FIG. 2) formed by the movable cowls 33. Thus, the reverser 30 allows channelling the secondary flow 20B towards the rear of the propulsion unit 1, so as to generate a thrust. Thus, in FIG. 1, the cascade vanes 32 and the movable cowls 33, which are axially secured to one another, are in an advanced position called direct thrust position.

FIG. 2 shows the same reverse 30 in a thrust reversal configuration. In this configuration, the movable reverser cowls 33 and the set of the movable system 29 are in an opening position, or retracted position, in which the cowls 33 are longitudinally remote from the fixed structure 31 so as to define a radial opening of the secondary flow path 21B.

The cascades 32 extend through this radial opening. In this thrust reversal configuration, the sealing flaps 34 are deployed radially in the secondary flow path 21B so as to direct the secondary flow 20B towards the cascade vanes 32, which allow directing the flow thus redirected towards the front of the propulsion unit 1, in order to generate a reverse thrust. Thus, in FIG. 2, the cascade vanes 32 and the movable cowls 33 of the movable system 29 are shown in a so-called backward thrust reversal position.

Figure 3:
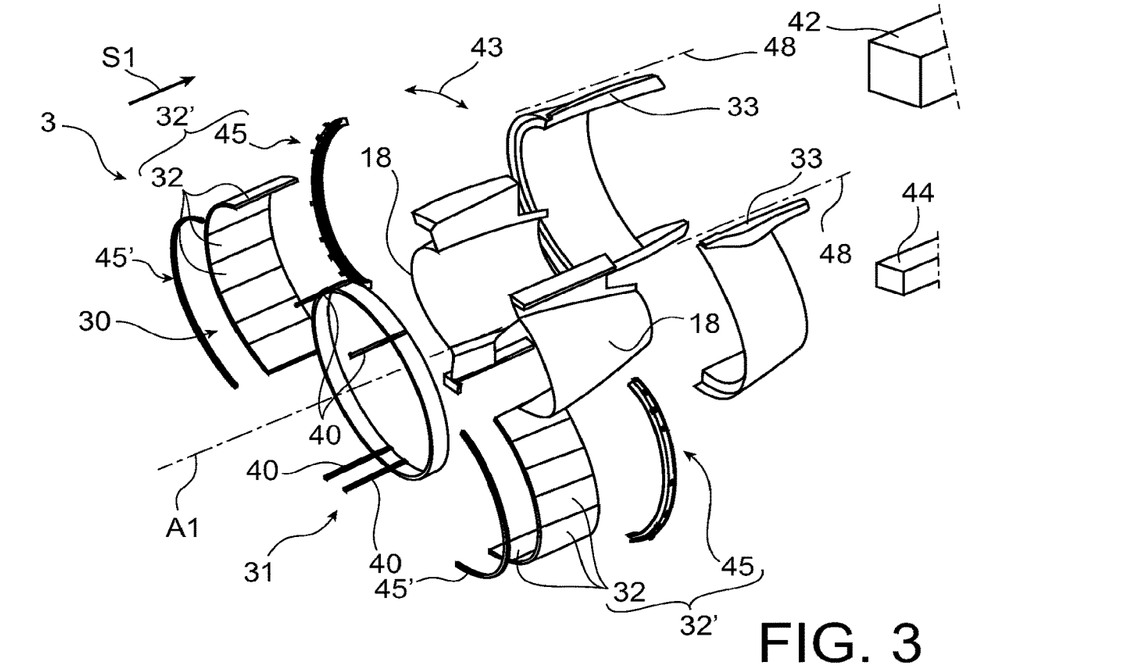
FIG. 3 is a perspective exploded view of a portion of the nacelle of the propulsion unit shown in the previous figures, showing in particular the elements of the thrust reverser.

FIG. 3 shows a perspective exploded view of some elements of the nacelle 3, among which a portion of the fixed structure 31 of the reverser 30, which has an annular general shape centred on the axis A1. More specifically, in this preferred embodiment of the invention, the fixed structure 31 is provided with a closed curve shape defining a ring-like general shape, locally following the external contour of the secondary flow path 21b according to the circumferential direction of the nacelle 43, with respect to the axis A1. The fixed structure 31 is also called "fixed frame" of the reverser.

The fixed structure 31 is equipped with elements for guiding the cascade vanes 32 during movement thereof between the advanced and backward positions, these elements comprising axial rails 40. For example, these consist of two rails 40 secured to an upper portion of the ring, and two other rails 40 secured to a lower portion of this same ring. In this case, the rails 40 are fastened to the fixed structure 31 by their rear end, whereas their front end is fastened to another casing (not shown in FIG. 3). Thus, the rails 40 ensure a function of guiding the cascade vanes 32 during the axial movement of these, but also, in the thrust reversal configuration, a function of taking up aerodynamic forces, primarily radial and tangential.

FIG. 3 schematically shows the cascade vanes 32, which follow one another according to the circumferential direction 43. In this case, they are grouped together into two lateral sets each comprising several cascade vanes 32, these sets being so-called sets of cascade vanes 32'.

Figure 4:
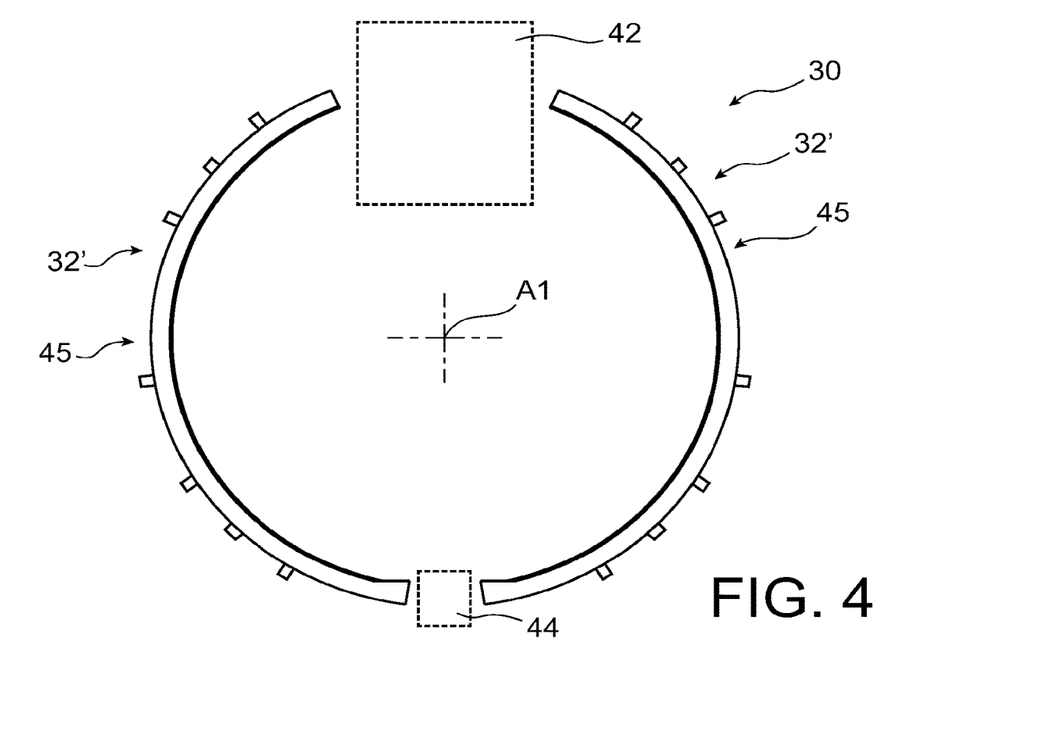
FIG. 4 is an axial view of the support rear structures of the cascade vanes shown in the previous figure.

Thus, each set of cascade vanes 32' includes several cascade vanes 32, and extends over an angular sector close to 180°. Preferably, the two assemblies 32' are preferably spaced apart laterally from one another at their opposite ends in pairs, to form upper and lower spaces respectively dedicated to the passage of the mast 42 and a lower longitudinal beam 44. Each set of cascade vanes 32' also includes a cascade vane support rear structure 45, on which a rear end of each of the cascade vanes 32 of the set 32' is fastened. These rear structures 45 are also called "rear frames of cascade vanes", and each extends circumferentially all along their associated lateral set 32', according to an identical or similar angular sector as shown in FIG. 4. Hence, the rear end of each cascade vane 32 is intended to be fastened on its associated rear structure 45, by conventional fastening means. Similarly, each set of cascade vanes 32' also includes a cascade vane support front structure 45', on which a front end of each of the cascade vanes 32 of the set 32' is fastened. These front structures 45' are also called "front frames of cascade vanes", and each extends circumferentially all along their associated lateral set 32', according to an identical or similar angular sector. Hence, the front end of each cascade vane 32 is intended to be fastened on its associated front structure 45', by conventional fastening means.

The above-described configuration is particularly well suitable in the case of a nacelle design wherein the cowls 18 of the second section are hingedly mounted, the reverser 30 then having a so-called "D"-like architecture, known by the Anglo-Saxon name "D-Duct". Nevertheless, the circumferential extent of the sets of cascade vanes 32' could be easily adapted according to the design of the reverser and of the nacelle, which could, for example, adopt a so-called "C"-like architecture, known by the Anglo-Saxon name "C-Duct", or else a so-called "O"-like architecture, known by the Anglo-Saxon name "O-Duct".

In a known manner, the fixed structure 31 includes members (not shown) forming radial and/or tangential and/or axial stops for the cascade vanes 32 of the sets 32'.

In FIG. 3, the elements of the nacelle 3 are completed by the hinged cowls 18, 33, allowing conferring the "D"-like architecture on the nacelle. In particular, the pivot axis 48 associated with each reverser cowl 33 has been illustrated, this pivot axis 48 being parallel or substantially parallel to the axis A1, and enabling the cowl 33 to be movable in rotation between a maintenance open position and a flight closed position, shown in FIG. 3.

Figure 5:
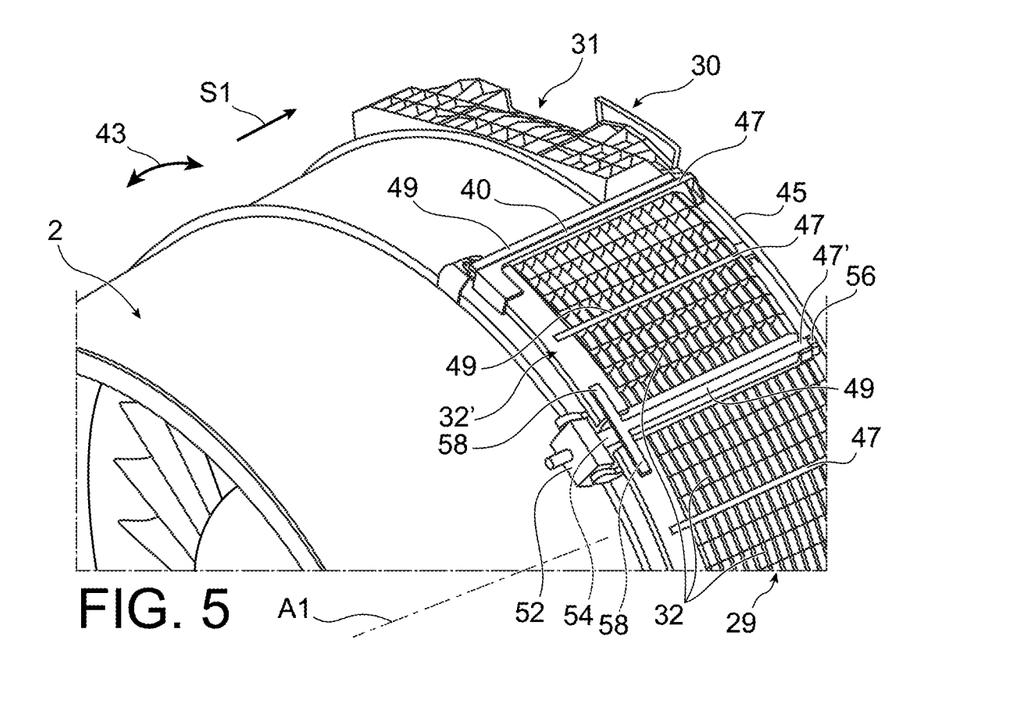
FIG. 5 is a more detailed perspective partial view of a portion of the reverser shown in the previous figures.

FIG. 5 shows in more details a portion of one of the two sets of cascade vanes 32'. Preferably, the two sets 32' have an identical or similar design, while being symmetrical with respect to a vertical and longitudinal plane passing through the axis A1. Consequently, the description that will be made hereafter will apply equally to each of these two sets 32'.

The set of cascade vanes 32' comprises inter-cascade axial structures 47, 47' arranged between the cascade vanes 32, according to the circumferential direction 43 of the nacelle and of its reverser 30. These inter-cascade axial structures 47, 47' extend over the entire length or substantially the entire axial length of the set 32', and are therefore arranged between the cascade vanes 32, in the direction 43. With their radially external surface 49, these axial structures 47, 47' form axial slide tracks for the movable system 29. In addition, these may consist of several kinds of structures, including elements 47 ensuring the function of mechanical junction between the cascade vanes 32, and inter-vane structures for limiting buckling 47', specific to the present invention. Only one single inter-cascade structure for limiting buckling 47' is visible in FIG. 5, but it several ones could be provided for within each set cascade vanes 32', preferably as many actuators 52 associated with each set 32'. Indeed, each structure 47' has a hollow shape internally defining a channel crossed by an actuator 52, herein a hydraulic cylinder, but which could alternatively be formed by an electric actuator. Next, only the cooperation between one of the inter-cascade structures 47' and its associated cylinder 52 will be described hereinbelow, but it should be understood that such a cooperation applies for all of the other cylinders and inter-cascade structures 47' of each set of cascade vanes 32'.

The cylinder 52 is formed by a fixed portion 54 comprising the cylinder sleeve, and a front end of which is for example fastened on the fan casing 11. The cylinder 52 is also formed by a movable portion 56 formed by the cylinder rod, and a rear end of which is hingedly fastened on the support rear structure 45.

The inter-cascade structure for limiting buckling 47' includes a front end conventionally fastened on the support front structure 45', this front end possibly including circumferential reinforcements 58 to reinforce mechanical fastening on this structure 45'. Furthermore, the inter-cascade structure for limiting buckling 47' includes a rear end fastened on the support rear structure 45, still using conventional means. Also, although this has not been shown, the inter-cascade structure for limiting buckling 47' may have along the latter means enabling fastening thereof on the two cascade vanes 32 arranged on either side according to the circumferential direction 43.

The fixed portion 54 of the cylinder 52 opens forwards of the front end of the inter-cascade structure for limiting buckling 47', whereas the movable portion 56 of the cylinder 52 opens rearwards of the rear end of the inter-cascade structure 47', as also visible in FIGS. 6 and 7 which will be described hereinbelow.

Figure 6:
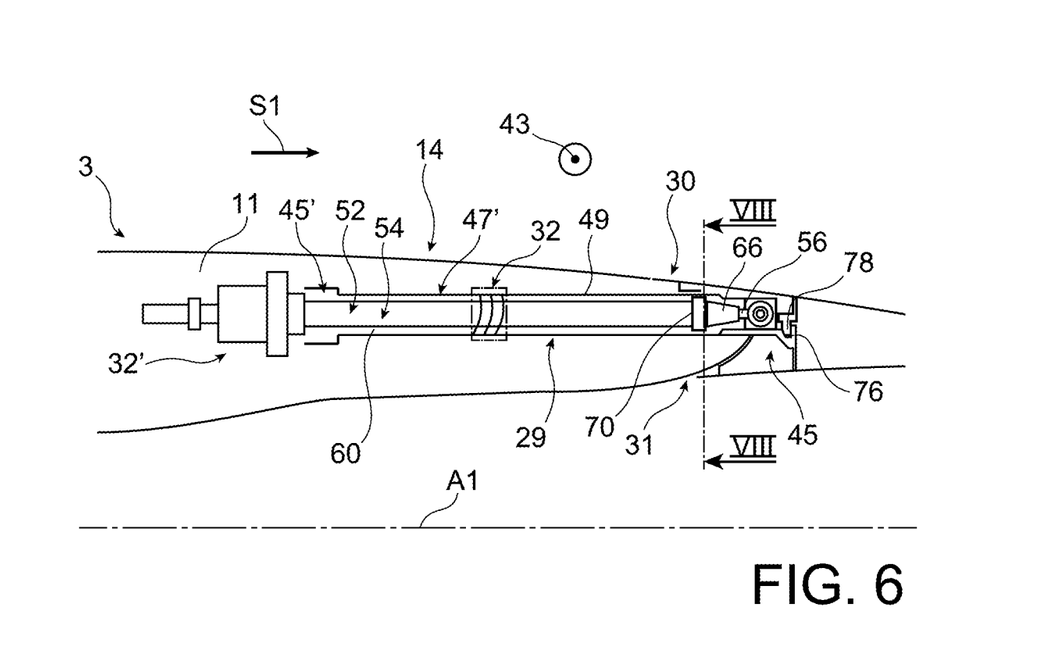
FIG. 6 is a schematic longitudinal sectional half-view of a rear portion of the propulsion unit shown in FIG. 1, more detailed, and still with the reverser in the direct thrust configuration.

FIG. 6 shows the movable system 29 of the reverser 30 in the advanced direct thrust position, in which the cylinder rod 56 is fully retracted into the cylinder sleeve 54, and the cascade vanes 32, inoperative, covered by the fan cowls 14. FIG. 7 shows the movable system 29 in the backward thrust reversal position, in which the cylinder rod 56 is fully extended rearwards, and the cascade vanes 32 retracted rearwards so as to be able to generate the thrust reversal function.

Figure 7:
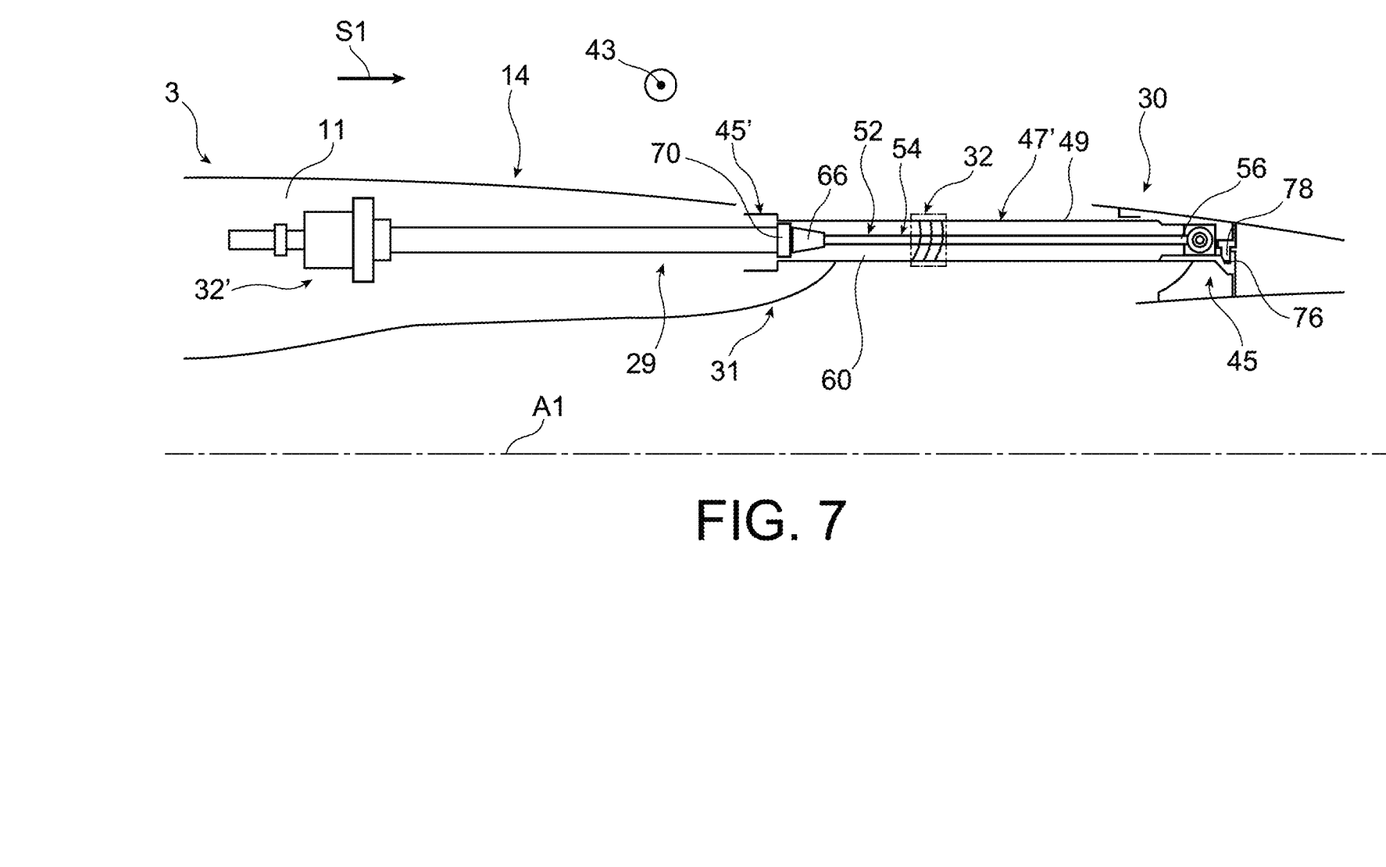
FIG. 7 is a schematic longitudinal sectional half-view of a rear portion of the propulsion unit shown in FIG. 2, more detailed, and still with the reverser in the thrust reversal configuration.
Figure 8:
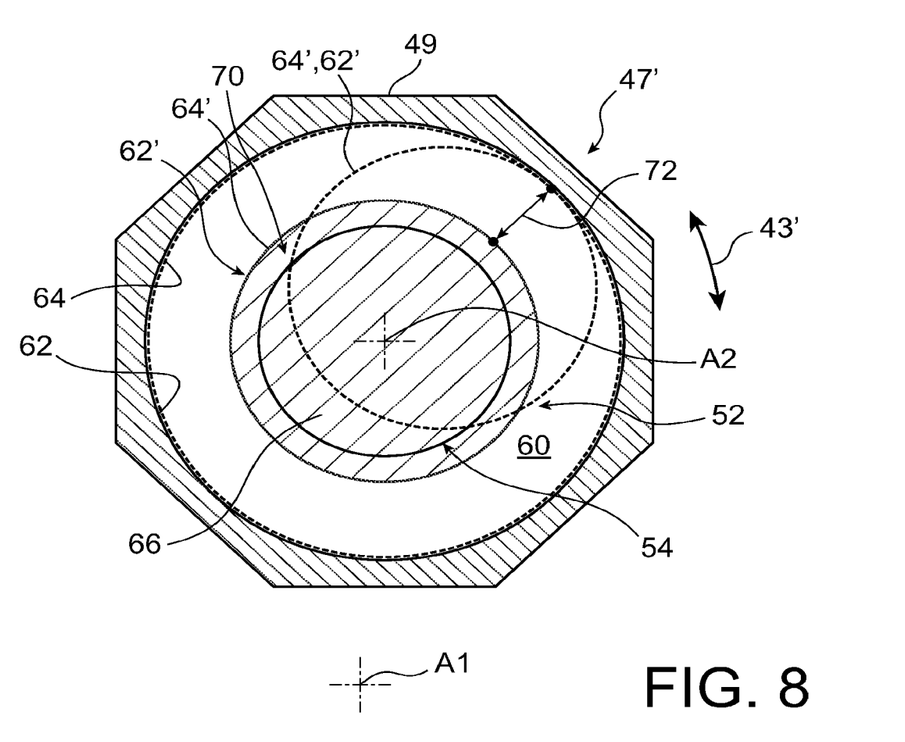
FIG. 8 is a cross-sectional view taken along the line VIII-VIII of FIG. 6.

In FIGS. 6 to 8, the inter-cascade structure for limiting buckling 47' is shown with its internal channel 60 directed parallel to the axis A1, and crossed by the cylinder 52 also directed parallel to the axis A1 The channel 60 is delimited by a cylindrical internal surface 62 extending circumferentially all along a first closed directrix curve 64, in this case circular shaped and centred on an axis A2 corresponding to the axis of the cylinder 52 in a mechanically unstressed configuration. The axis A2 is parallel to the axis A1, or substantially parallel thereto. In other words, in this preferred embodiment, the cylindrical internal surface 62 of the inter-cascade structure 47' remains uninterrupted all along a circumferential direction 43' of this structure 47', with respect to the axis A2. Hence, the cylindrical internal surface 62 continuously follows the first closed directrix curve 64 in the form of a circle, defined by a generatrix parallel to the axis A2 which follows this same curve 64.

In this case, the channel 60 defined by the surface 62 extends cylindrically, preferably all along the inter-cascade structure 47'. The fixed portion 54 of the cylinder that crosses the channel 60 comprises an outlet end 66 of the movable portion 56, corresponding to its rear end. In the advanced direct thrust position of FIG. 6, this outlet end 66 is accommodated in the channel 60, proximate to a rear end of the movable inter-cascade structure 47'.

According to a particular feature of the invention, the outlet end 66 of the fixed portion of the cylinder 52 is equipped with an external ring 70 for limiting buckling of the cylinder. The ring 70, arranged around the cylinder sleeve, has a cylindrical external surface 62' extending circumferentially all along a second closed directrix curve 64', herein circular shaped and also centred on the axis A2. In other words, in this preferred embodiment, the cylindrical external surface 62' of the inter-cascade structure 47' remains uninterrupted according to the circumferential direction 43' of this structure 47', with respect to the axis A2. Hence, the cylindrical external surface 62' continuously follows the second closed directrix curve 64' in the form of a circle, defined by a generatrix parallel to the axis A2 that follows this same curve 64'.

In a buckling unconstrained configuration of the cylinder 52, as shown in FIGS. 6 to 8 in axial view according to the axes A1 and A2, the first and second closed directrix curves 64, 64' are preferably concentric and have the same shapes, the first one having a dimension greater than the second one so as to define a constant spacing 72 all along these according to the direction 43'.

With such a design, in the event of a loading of the cylinder 52 resulting in buckling thereof, this phenomenon remains controlled thanks to the possible cooperation between the ring 70 and the internal surface 62 of the channel 60. Indeed, the ring 70 equipping the outlet end 66 of the fixed portion of the cylinder 52 serves as a potential radial stop on the inter-cascade structure 47'. Thus, during the movement of the movable system 29 of the reverser towards its advanced direct thrust position, the amplitude of a possible buckling of the cylinder 52 remains controlled by not being able to exceed the value of the initial spacing 72 between the two curves 64, 64'. When this gap 72 is consumed, the cylindrical external surface 62' of the ring 70 comes into contact with the cylindrical internal surface 62 of the channel 60, thereby limiting buckling of the cylinder to a controlled and non-detrimental amplitude. Such a situation is schematised in dotted lines in FIG. 8.

The external ring for limiting buckling 70 may be made in one-piece, i.e. a monolithic part, or preferably be split or sectorised to facilitate implantation and replacement thereof around the cylinder fixed sleeve. In the case where this ring 70 is sectorised, it may for example consist of two half-shells attached around the cylinder sleeve.

In order to limit the friction forces between the inter-cascade structure 47' and the ring 70, during a movement of the movable system 29 and in case of a buckling of the cylinder contained by the inlet in contact with these elements 47', 70, The ring is preferably made of a conventional antifriction material, known to a person skilled in the art. Alternatively, only one antifriction coating may be provided on the ring 70 to form the external surface 64', without departing from the scope of the invention. In case of wear, the ring 70 may advantageously be replaced around the cylinder sleeve.

During the movement of the movable system 29 of the reverser towards its backward thrust reversal position, the ring 70 moves axially relative to the moving channel 60. In the backward thrust reversal position of FIG. 7, the outlet end 66 and the ring 70 which surrounds it are accommodated in the channel 60, proximate to a front end of the movable inter-cascade structure 47'.

All along an axial section of the fixed portion 54 of the cylinder, which, at least at one time point, is radially covered by the inter-cascade structure 47' during its movement accompanying the change in position of the movable system 29, it is the ring 70 which forms the radially largest portion of this section, i.e. the portion with the largest diameter. This enables the ring 70 to create the privileged contact point of the cylinder 52 with the inter-cascade structure 47', in case of buckling of the cylinder.

FIG. 6 shows another functionality of the rear structure 45 of the set of cascade vanes 32', which consists in making the axial connection with the reverser cowl 33, in its flight closed position. The rear end of the structure 45 comprises an axial connecting member 76 in the form of an annular groove open radially outwards, cooperating with a complementary axial connecting member 78 provided on a front end of the reverser cowl 33. Preferably, this member 78 is in the form of a radial projection inwards, accommodated in the groove 76 so as to obtain the axial coupling in the closed position of the cowl 33. When opening the latter towards its maintenance open position, the projection 78 is extracted from the groove 76.

Figure 9:
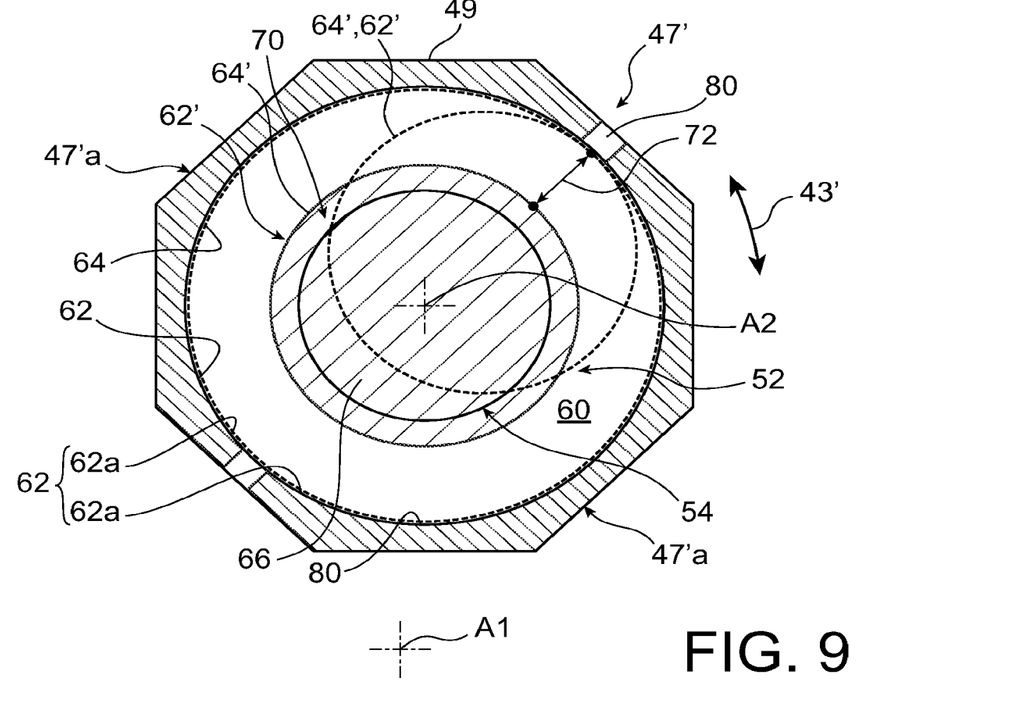
FIG. 9 is a cross-sectional view similar to that of FIG. 8, according to another preferred embodiment of the invention.

According to another embodiment shown in FIG. 9, the two curves 64, 64' remain circular in shape, but the cylindrical internal surface 62 of the channel is no longer continuous. It is circumferentially interrupted by extending along only one portion of the first closed directrix curve 64, so as to define several cylindrical internal surface angular sectors 62a. In this case, these are two angular sectors 62a, 62a that are spaced apart from one another by two surface interruptions 80. In this configuration, the inter-cascade structure for limiting buckling 47' is preferably made using two axial beams 47'a, 47'a respectively defining the two angular sectors 62a, 62a. Each beam extends over the entire length of the set of cascade vanes 32', by being fastened at its ends on the front and rear support structures on which the front and rear ends of the cascade vanes 32 are also fastened.

The surface interruptions 80, corresponding to empty portions between the two beams 47'a of the inter-cascade structure 47', preferably extend over a small angular amplitude. Each cylindrical internal surface angular sector 62a, as well as its entire associated beam 47'a, may extend over an amplitude greater than 100°, and for example close to 180° as shown in FIG. 9.

It should be noted that a similar principle could be adopted for the cylindrical external surface 62' of the ring 70, by providing for surface interruptions spacing apart cylindrical external surface angular sectors.

Figure 10:
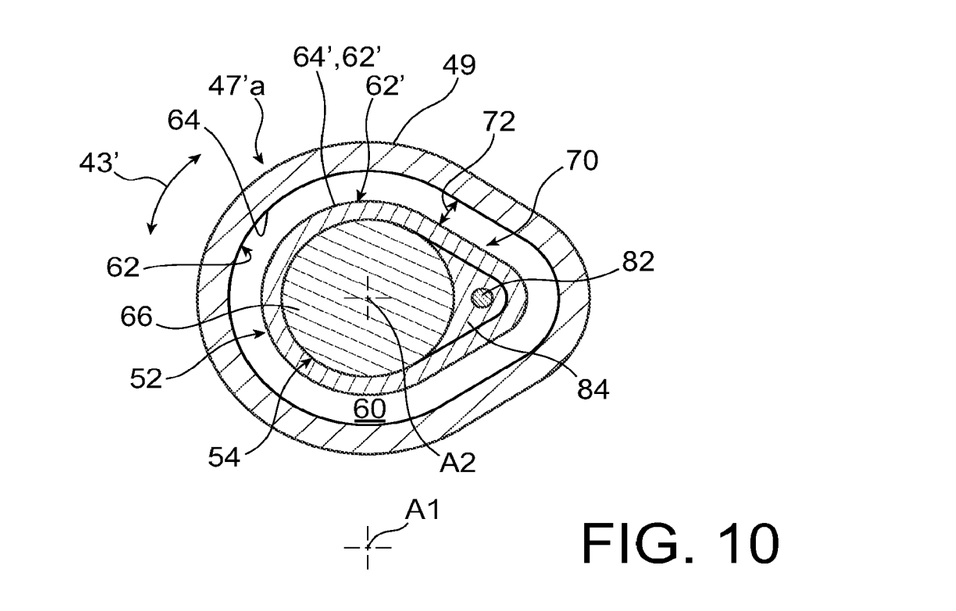
FIG. 10 is a cross-sectional view similar to that of FIG. 8, according to still another preferred embodiment of the invention.

According to another embodiment shown in FIG. 10, the two closed directrix curves 64, 64' are no longer in the form of a circle, but for example slightly ovalised on one side so as to take into account the general shape of the fixed portion 54 of the cylinder, provided with its external equipment like an oil return pipe 82 and its fitting 84 for holding the cylinder sleeve. Thus, the shape of the channel 60 and of the ring 70 may be adapted according to the external general shape of the fixed portion 54 of the cylinder 52, still while preserving a constant radial spacing 72 in the buckling unconstrained state.

Of course, various modifications could be made by a person skilled in the art to the invention that has just been described, only as non-limiting examples, and the scope of which is defined by the appended claims. In particular, the different preferred embodiments that have been described can be combined. In addition, the thrust reverser 30 may alternatively have a "C"-like or "O"-like architecture.

The invention claimed is:

1. A thrust reverser for an aircraft propulsion unit, the reverser having a longitudinal central axis and comprising:
    a fixed structure;
    a movable system, the movable system comprising a reverser cowl and a set of cascade vanes comprising a plurality of cascade vanes;
    an actuator equipped with a fixed portion and a portion movable relative to the fixed portion, so as to be able to move the movable system in translation relative to the fixed structure of the reverser according to the longitudinal central axis, between an advanced direct thrust position and a backward thrust reversal position, the actuator being a hydraulic or electric actuator,
    wherein the movable system also includes an inter-cascade structure for limiting buckling of the actuator, the inter-cascade structure being interposed between two directly consecutive cascade vanes of the plurality of cascade vanes and forming a channel crossed by the actuator, the channel being delimited by a cylindrical internal surface extending circumferentially along at least one portion of a first closed directrix curve,
    wherein the fixed portion of the actuator passes through the channel and comprises an outlet end of the movable portion, said outlet end being equipped with an external ring for limiting buckling of the actuator, the external ring having a cylindrical external surface extending circumferentially along at least one portion of a second closed directrix curve,
    wherein the external ring is arranged around the outlet end, and
    wherein in the backward thrust reversal position, the external ring is surrounded by the cylindrical internal surface delimiting the channel.

2. The reverser according to claim 1, wherein, in a configuration without buckling of the actuator, the first and second closed directrix curves have, when viewed according to the longitudinal central axis, same shapes and are concentric by being spaced apart from one another by a same radial spacing.

3. The reverser according to claim 1, wherein said at least one set of cascade vanes comprises a rear structure for supporting the cascade vanes on which a rear end of the plurality of cascade vanes is fastened, and a front structure for supporting the cascade vanes on which a front end of the plurality of cascade vanes is fastened, and wherein the inter-cascade structure for limiting buckling of the actuator includes a front end and a rear end respectively fastened on the support front structure and on the support rear structure.

4. The reverser according to claim 1, wherein the first and second closed directrix curves have a circular shape.

5. The reverser according to claim 1, wherein the cylindrical internal surface of the channel extends circumferentially all along the first closed directrix curve, the inter-cascade structure for limiting buckling of the actuator being made in one-piece.

6. The reverser according to claim 1, wherein the cylindrical internal surface of the channel is circumferentially interrupted by extending along only one portion of the first closed directrix curve, so as to define several cylindrical internal surface angular sectors, two angular sectors of the several cylindrical internal angular sectors being spaced apart from one another, the inter-cascade structure for limiting buckling of the actuator being made using two axial beams respectively defining the two angular sectors of the several cylindrical internal angular sectors.

7. The reverser according to claim 1, wherein the inter-cascade structure for limiting buckling of the actuator includes an external surface forming an axial slide track for the movable system.

8. The reverser according to claim 1, wherein the external ring for limiting buckling is made in one-piece, split, or sectorised.

9. A propulsion unit for an aircraft, comprising a turbomachine and a nacelle equipped with a thrust reverser according to claim 1.

* * * * *